(12) United States Patent
Haruna

(10) Patent No.: US 12,134,157 B2
(45) Date of Patent: Nov. 5, 2024

(54) CLAMPING APPARATUS

(71) Applicant: KOSMEK LTD., Kobe (JP)

(72) Inventor: Yosuke Haruna, Kobe (JP)

(73) Assignee: KOSMEK LTD., Kobe (JP)

( * ) Notice: Subject to any disclaimer, the term of this patent is extended or adjusted under 35 U.S.C. 154(b) by 331 days.

(21) Appl. No.: 17/771,952

(22) PCT Filed: Oct. 13, 2020

(86) PCT No.: PCT/JP2020/038559
§ 371 (c)(1),
(2) Date: Apr. 26, 2022

(87) PCT Pub. No.: WO2021/085110
PCT Pub. Date: May 6, 2021

(65) Prior Publication Data
US 2022/0371137 A1 Nov. 24, 2022

(30) Foreign Application Priority Data
Oct. 28, 2019 (JP) ................................. 2019-195284

(51) Int. Cl.
*B23Q 3/08* (2006.01)
*B23Q 1/00* (2006.01)
*B25J 15/04* (2006.01)

(52) U.S. Cl.
CPC ............. *B23Q 3/082* (2013.01); *B23Q 1/009* (2013.01); *B25J 15/0408* (2013.01)

(58) Field of Classification Search
CPC ...... B23Q 1/0081; B23Q 1/009; B23Q 3/082; B23Q 5/58; B23Q 3/10; B23Q 2703/04;
(Continued)

(56) References Cited

U.S. PATENT DOCUMENTS 6,527,266 B1 * 3/2003 Yonezawa ............ B23Q 1/0081
269/309
2006/0055099 A1 * 3/2006 Haruna ................ B23Q 1/0081
269/309
(Continued)

FOREIGN PATENT DOCUMENTS

JP          5 690275 B2     3/2015
WO   WO-2004067224 A1 *    8/2004 ........... B23Q 1/0081
(Continued)

OTHER PUBLICATIONS

Search Report dated ADec. 1, 2020, issued in corresponding International application No. PCT/JP2020/038559.

*Primary Examiner* — Mahdi H Nejad
(74) *Attorney, Agent, or Firm* — BACON & THOMAS, PLLC

(57) ABSTRACT

When an operation portion (38) provided at an axial end portion of a valve member (37) is pushed into a valve case (31) provided to a first block (3), a clamping apparatus transitions from a first state, in which communication between: each of a primary-side pressure fluid supply/discharge port (34) and a secondary-side pressure fluid supply/discharge port (35); and a pressure fluid discharge port (36) is open, to a second state, in which communication between: each of the primary-side pressure fluid supply/discharge port (34) and the secondary-side pressure fluid supply/discharge port (35); and the pressure fluid discharge port (36) is closed.

5 Claims, 7 Drawing Sheets

(58) Field of Classification Search
CPC .............. B23Q 2703/12; B25J 15/0416; B25J 15/0408; B25J 15/04; B25J 9/0009
USPC .................................................. 269/25, 309
See application file for complete search history.

(56) References Cited

U.S. PATENT DOCUMENTS

2011/0241331 A1\* 10/2011 Arisato ................... F16L 37/36
                                                                         285/18
2012/0174351 A1    7/2012  Haruna
2021/0190236 A1\*  6/2021  Haruna ..................... F16L 5/00
2022/0371137 A1\* 11/2022  Haruna ................... B23Q 5/58

FOREIGN PATENT DOCUMENTS

| WO | WO-2014002684 A1 \* | 1/2014 | ............. B23Q 1/009 |
| WO | WO-2021177385 A1 \* | 9/2021 | |
| WO | WO-2024070395 A1 \* | 4/2024 | |

\* cited by examiner

CLAMPING APPARATUS

TECHNICAL FIELD

The present invention relates to a clamping apparatus configured to detachably fix a machine tool, jig, pallet, or the like to a robot arm, table, or the like.

BACKGROUND ART

Known examples of such a clamping apparatus include an apparatus described in Patent Literature 1 specified below. The known apparatus is structured as follows.

The clamping apparatus described in Patent Literature 1 is configured to fix, for example, a work pallet functioning as a movable block to, for example, a clamp pallet functioning as a reference block. The clamping apparatus includes: a piston hermetically inserted in the reference block so as to be movable in an up-down direction; an annular plug portion protruding upward from the reference block; an output rod connected to the piston and configured to move the movable block downward; and the like. A lock chamber is provided above the piston, while a release chamber is provided below the piston.

When compressed air is supplied to the release chamber, the output rod is raised, and this brings the clamping apparatus into a release state, in which the movable block is detachable from the reference block. When compressed air is supplied to the lock chamber, the output rod is lowered, and the movable block is pulled toward the reference block and fixed to the reference block (the apparatus transitions to a lock state).

Citation List

Patent Literature
  Patent Literature 1: Japanese Patent No. 5690275

SUMMARY OF INVENTION

Technical Problem

The apparatus described in Patent Literature 1 has the following disadvantages.

If compressed air is supplied to the release chamber in the lock state due to an operating error, the clamping apparatus transitions to the release state, and the movable block is unintentionally released and free from the reference block. Furthermore, if compressed air is supplied to the lock chamber without the movable block, engagement balls protrude outward in the radial direction relative to the plug portion. If the movable block is placed on the reference block in this state, an engaged portion for clamping provided on the movable block collides with the engagement balls, to cause damage to both of these elements.

An object of the present invention is to provide a clamping apparatus arranged to be capable of preventing unintentional operation.

Solution to Problem

In order to achieve the above object, in an aspect of the present invention, a clamping apparatus is structured as follows, as shown in FIG. 1 to FIG. 7, for example.

The clamping apparatus in this aspect of the present invention includes: a piston 8 including a piston main body 9 hermetically inserted in a first block 3 so as to be movable in an axial direction of the piston 8; a lock chamber 10, to and from which pressure fluid is supplied and discharged, the lock chamber 10 being provided on a forward or backward side relative to the piston main body 9; a lock port 13, which is provided to the first block 3 and through which pressure fluid is supplied to/discharged from the lock chamber 10; a release chamber 11, to and from which pressure fluid is supplied and discharged, the release chamber 11 being provided on a side opposite from the lock chamber 10 relative to the piston main body 9 interposed between the lock chamber 10 and the release chamber 11; a release port 15, which is provided to the first block 3 and through which pressure fluid is supplied to/discharged from the release chamber 11; a plug portion 16 protruding from the first block 3 and configured to be inserted in a second block 4, the plug portion 16 having a tubular shape in which an output rod portion 17 of the piston 8 is inserted so as to be movable in the axial direction; an engaging means 19 configured to pull the second block 4 toward the first block 3 and fix the second block 4 as the output rod portion 17 moves in the axial direction; a valve case 31, which is provided to the first block 3 and to which there are provided a primary-side pressure fluid supply/discharge port 34 connected to a pressure fluid supply source, a pressure fluid discharge port 36 through which pressure fluid is discharged, and a secondary-side pressure fluid supply/discharge port 35 connected to the lock port 13 or to the release port 15; and a valve member 37 disposed in the valve case 31, the valve member 37 having, at its end portion in the axial direction, an operation portion 38 protruding from the valve case 31. When the operation portion 38 is pushed into the valve case 31, the apparatus transitions from a first state, in which communication between: each of the primary-side pressure fluid supply/discharge port 34 and the secondary-side pressure fluid supply/discharge port 35; and the pressure fluid discharge port 36 is open, to a second state, in which communication between: each of the primary-side pressure fluid supply/discharge port 34 and the secondary-side pressure fluid supply/discharge port 35; and the pressure fluid discharge port 36 is closed.

The above-described clamping apparatus of this aspect provides the following functions and effects.

Even if pressure fluid is supplied to the primary-side pressure fluid supply/discharge port due to an operating error, pressure fluid is discharged from the pressure fluid discharge port when the operation portion is not pushed in the valve case, and therefore the piston is not actuated. That is, the clamping apparatus of the above aspect of the invention is capable of preventing unintentional operation.

In the clamping apparatus of the above aspect of the invention, it is preferable that: a communication passage 43, which communicatively connects the primary-side pressure fluid supply/discharge port 34 to the secondary-side pressure fluid supply/discharge port 35, is provided in the valve case 31 on a first side close to the operation portion 38 relative to a valve element body 40 of the valve member 37; and while pressure fluid is supplied to the communication passage 43 from the primary-side pressure fluid supply/discharge port 34 to the secondary-side pressure fluid supply/discharge port 35, pressure of the pressure fluid keeps the pushed operation portion 38 within the valve case 31.

In this arrangement, the second state, in which communication between: each of the primary-side pressure fluid supply/discharge port and the secondary-side pressure fluid supply/discharge port; and the pressure fluid discharge port is closed, is maintained while pressure fluid is supplied to the primary-side pressure fluid supply/discharge port, and this keeps the level of pressure of pressure fluid in the lock chamber or in the release chamber.

Furthermore, in the clamping apparatus of the above aspect of the invention, it is preferable that: a biasing means 46 configured to bias the valve element body 40 in a direction in which the operation portion 38 protrudes from the valve case 31 is disposed in a pressure fluid discharge chamber 45 in the valve case 31, the pressure fluid discharge chamber 45 being provided on a second side opposite from the operation portion 38 relative to the valve element body 40; and the operation portion 38 is configured to be pushed in the valve case 31 against a biasing force of the biasing means 46.

In this arrangement, the operation portion is kept protruding from the valve case in a normal state in which a force pushing the operation portion into the valve case is not applied to the operation portion. Furthermore, this arrangement stabilizes the movement of the valve element body (valve member) in the axial direction.

Furthermore, in the clamping apparatus of the above aspect of the invention, it is preferable that an annular elastic member 41, configured to be pressed onto a valve seat 42 provided on an inner peripheral surface of the valve case 31, is attached in an annular groove 40a provided on an outer peripheral surface of the valve element body 40.

In this arrangement, communication between: each of the primary-side pressure fluid supply/discharge port and the secondary-side pressure fluid supply/discharge port; and the pressure fluid discharge port is more reliably closed.

Advantageous Effects of Invention

According to embodiments of the present invention, it is possible to prevent unintentional operation of a clamping apparatus.

DESCRIPTION OF EMBODIMENTS

Figure 1:
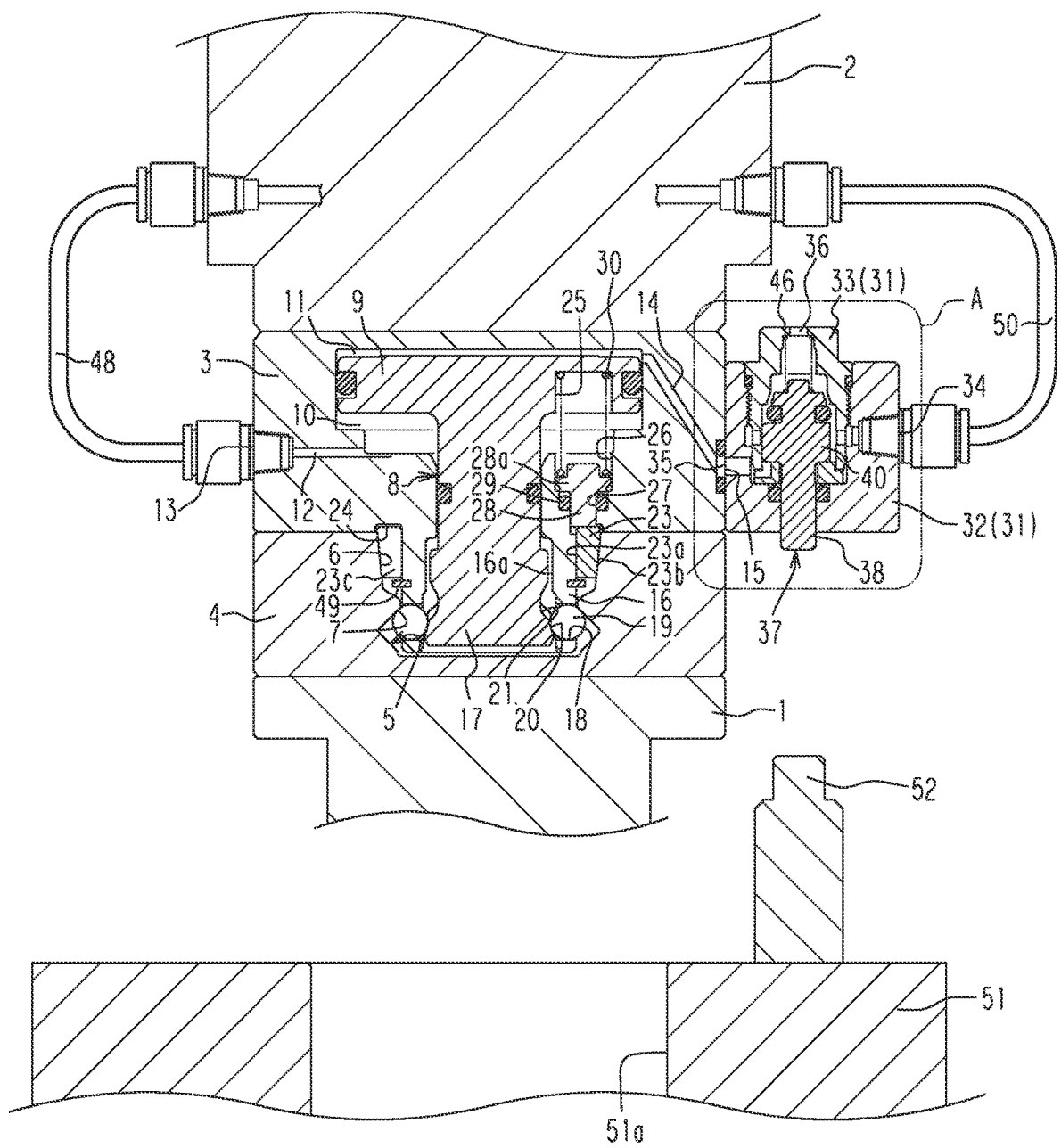
FIG. 1 shows a first embodiment of the present invention, and is an elevational view in section of a clamping apparatus (tool changer) in a lock state.

FIG. 1 to FIG. 6 show a first embodiment of the present invention. A tool changer serving as a clamping apparatus of the first embodiment is used to attach/detach a tool 1 such as a machine tool and a jig to/from a robot arm 2. The tool changer is configured as follows, for example.

A master cylinder 3 functioning as a first block is fixed to a leading end portion of the robot arm 2. A tool adapter 4 functioning as a second block is fixed to an end portion of the tool 1. The tool adapter 4 has a recess 5, in which a tapered hole 6 for positioning and an engaged portion 7 for clamping are provided in this order from an opening side to a bottom side of the recess 5.

A piston main body 9 of a piston 8 is hermetically inserted in a bottom-side portion in the master cylinder 3 so as to be movable in an axial direction of the piston 8. A lock chamber 10 is provided on a forward side relative to the piston main body 9, while a release chamber 11 is provided on a backward side relative to the piston main body 9. The lock chamber 10 is communicatively connected to a lock port 13 provided on a first side surface of the master cylinder 3 via a passage 12. Meanwhile, the release chamber 11 is communicatively connected to a release port 15 provided on a second side surface of the master cylinder 3 via a passage 14. Compressed air functioning as pressure fluid is supplied to and discharged from the lock port 13 and the release port 15.

A tubular plug portion 16, which is unitary with the master cylinder 3, protrudes outward from the master cylinder 3. The plug portion 16 is configured to be inserted in the recess 5 of the tool adapter 4. An output rod portion 17 of the piston 8 is inserted in a tubular hole 16a of the plug portion 16 so as to be movable in the axial direction. The piston 8 including the output rod portion 17 and the piston main body 9 may be a unitary element made of one material, or may be structured by connecting separately-made components together.

A plurality of through holes 18 are bored through a leading end portion of a peripheral wall of the plug portion 16, at predetermined intervals with respect to its circumferential direction. An engagement ball 19 is supported in each of the through holes 18 so as to be movable between a radially outward engaged position (see FIG. 1) and a radially inward disengaged position. Here "radially" means a radial direction of the output rod portion 17. For each engagement ball 19, a pushing surface 20 and a retraction groove 21 are provided on a leading end portion of an outer peripheral surface of the output rod portion 17. Each pushing surface 20 and its corresponding retraction groove 21 are continuous with each other in the axial direction. The engagement balls 19 are an example of an engaging means configured to pull the tool adapter 4 toward the master cylinder 3 and to fix the tool adapter 4, through the backward movement of the output rod portion 17.

A sleeve 23, which is expandable and contractible in its radial direction, is disposed on an outer periphery of a base end portion of the peripheral wall of the plug portion 16. A straight inner peripheral surface 23a of the sleeve 23 is supported by an outer peripheral surface of the plug portion 16 so as to be movable in the axial direction. A tapered outer peripheral surface 23b of the sleeve 23 is configured to be engageable with the tapered hole 6 of the tool adapter 4. The sleeve 23 of this embodiment has a slit 23c at a part of its peripheral wall. This allows the sleeve 23 to contract when an external force is exerted on the tapered outer peripheral surface 23b, and to expand due to its elastic restoring force when the external force is lifted. A base end portion of the sleeve 23 is inserted in an annular groove 24 provided on a leading end surface of the master cylinder 3.

A sleeve advancing means configured to push the sleeve 23 toward a leading end side is provided. The sleeve advancing means is structured as follows. A blind hole 25 is provided so as to open onto a surface of the piston main body 9, which is close to the lock chamber 10. A recess 26 opposed to the hole 25 is provided in the lock chamber 10. A through hole 27, which communicatively connects an outer surface of the master cylinder 3 to the recess 26, is provided. A pushing member 28 is hermetically inserted in the through hole 27 via a sealing member 29, and a leading end of the pushing member 28 is opposed to the sleeve 23. An advance spring 30 is disposed between a spring receiver 28*a* provided on a base end portion of the pushing member 28 and a bottom surface of the hole 25. Due to this arrangement, the advance spring 30 biases the sleeve 23 toward the leading end side via the pushing member 28. A retaining ring 49 provided on the outer periphery of the plug portion 16 prevents the sleeve 23 from moving toward the leading end side more than a predetermined distance.

A valve case 31 is provided on the second side surface of the master cylinder 3, on which the release port 15 is provided. The valve case 31 includes: a valve case main body 32; and a tubular lid member 33 screwed and fixed to the valve case main body 32 via a sealing member 47.

A primary-side pressure fluid supply/discharge port 34 is provided on a first side surface of the valve case main body 32. A secondary-side pressure fluid supply/discharge port 35 is provided on a second side surface of the valve case main body 32, which is opposite from the first side surface. The secondary-side pressure fluid supply/discharge port 35 is connected to the release port 15. A pressure fluid discharge port 36 through which compressed air is discharged is provided on an axial end surface of the lid member 33.

A valve member 37 is disposed in the valve case main body 32. A rod-like pusher 38, functioning as an operation portion and protruding from the valve case main body 32, is provided at an axial end portion of the valve member 37. The pusher 38 is hermetically inserted in a through hole 32*a* bored through the valve case main body 32 via a sealing member 39. The valve member 37 has a valve element body 40 having a diameter larger than that of the pusher 38. An annular elastic member 41 is attached in an annular groove 40*a* provided on an outer peripheral surface of the valve element body 40. A tapered valve seat 42 is provided on an inner peripheral surface of the lid member 33. The elastic member 41 is configured to be pressed onto the valve seat 42.

A communication passage 43, which communicatively connects the primary-side pressure fluid supply/discharge port 34 to the secondary-side pressure fluid supply/discharge port 35, is provided on a first side close to the pusher 38 relative to the valve element body 40. When the pusher 38 protrudes outward relative to the valve case main body 32, the communication passage 43 may be or may not be closed by contact between the valve element body 40 and a ring member 44 disposed on a bottom portion of the valve case main body 32. Even in the arrangement in which the communication passage 43 is closed by the contact between the ring member 44 and the valve element body 40, the communication passage 43 is opened when the pusher 38 is pushed into the valve case main body 32.

A pressure fluid discharge chamber 45, which is communicatively connected to the pressure fluid discharge port 36, is provided on a second side, which is opposite from the pusher 38, i.e., from the first side relative to the valve element body 40. A spring 46 functioning as a biasing means is disposed in the pressure fluid discharge chamber 45. The spring 46 biases the valve element body 40 in a direction in which the pusher 38 protrudes from the valve case main body 32.

The tool changer having the above-described structure operates as follows.

In a lock state shown in FIG. 1, compressed air has been discharged from the release chamber 11, and compressed air has been supplied to the lock chamber 10 from a robot arm 2 side via a pipe 48. As compressed air is supplied to the lock chamber 10, the piston main body 9 raises the output rod portion 17 due to the increased pressure in the lock chamber 10, thereby to move the engagement balls 19 outward in the radial direction of the output rod portion 17. The engagement balls 19 are then engaged with the engaged portion 7. Due to an upward force acting on the output rod portion 17, the tool adapter 4 is firmly fixed to the master cylinder 3, and thereby the tool 1 is fixed to the robot arm 2 via the tool changer.

At this time, the valve member 37 in the valve case 31 is biased by the spring 46, and the pusher 38 provided at its axial end portion protrudes from the valve case main body 32. Meanwhile, a gap is created between the valve element body 40 (the elastic member 41 attached to the valve element body 40) and the valve seat 42, and therefore communication between: each of the primary-side pressure fluid supply/discharge port 34 and the secondary-side pressure fluid supply/discharge port 35; and the pressure fluid discharge port 36 is open. Because of this, even if compressed air is supplied to the primary-side pressure fluid supply/discharge port 34 from the robot arm 2 side through a pipe 50 due to an operating error, the compressed air is discharged from the pressure fluid discharge port 36. Furthermore, the pressure in the release chamber 11 does not increase because the communication between the release chamber 11 and the pressure fluid discharge port 36 is kept open via the passage 14, the secondary-side pressure fluid supply/discharge port 35, and the like. Due to these, the piston 8 (piston main body 9) does not descend. As a result, the tool 1 is kept fixed to the robot arm 2.

When detaching the tool 1 from the robot arm 2, first of all, the tool 1 is fitted in a recess 51*a* of a tool stocker 51 by operating the robot arm 2. In the vicinity of the recess 51*a*, a pusher pressing member 52, with which the pusher 38 is pushed into the valve case 31, is provided on a top surface of the tool stocker 51.

Figure 2:
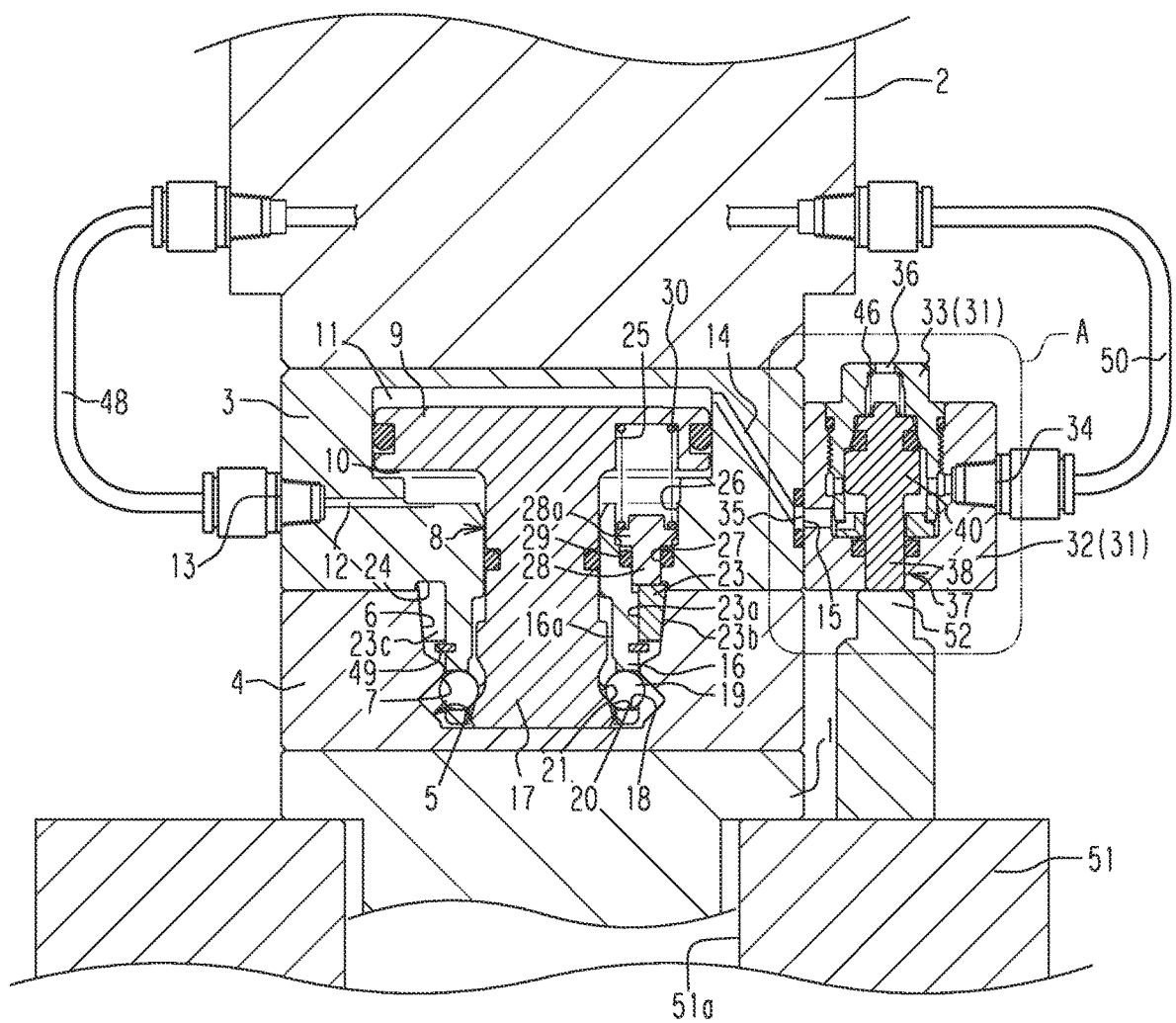
FIG. 2 is an elevational view in section of the clamping apparatus which is in the course of transition from the lock state to a release state.

As shown in FIG. 2, almost simultaneously with the fitting of the tool 1 in the recess 51*a* of the tool stocker 51, the pusher 38 comes into contact with a leading end of the pusher pressing member 52, and the pusher pressing member 52 pushing the pusher 38 into the valve case 31 against the biasing force of the spring 46. As a result, the elastic member 41 attached to the valve element body 40 is pressed onto the valve seat 42 provided on an inner peripheral surface of the valve case 31, and the device transitions from a first state, in which communication between: each of the primary-side pressure fluid supply/discharge port 34 and the secondary-side pressure fluid supply/discharge port 35 (communication passage 43); and the pressure fluid discharge port 36 is open, to a second state, in which communication between: each of the primary-side pressure fluid supply/discharge port 34 and the secondary-side pressure fluid supply/discharge port 35 (communication passage 43); and the pressure fluid discharge port 36 is closed while the flow of compressed air from the primary-side pressure fluid supply/discharge port 34 to the secondary-side pressure fluid supply/discharge port 35 is allowed.

Figure 3:
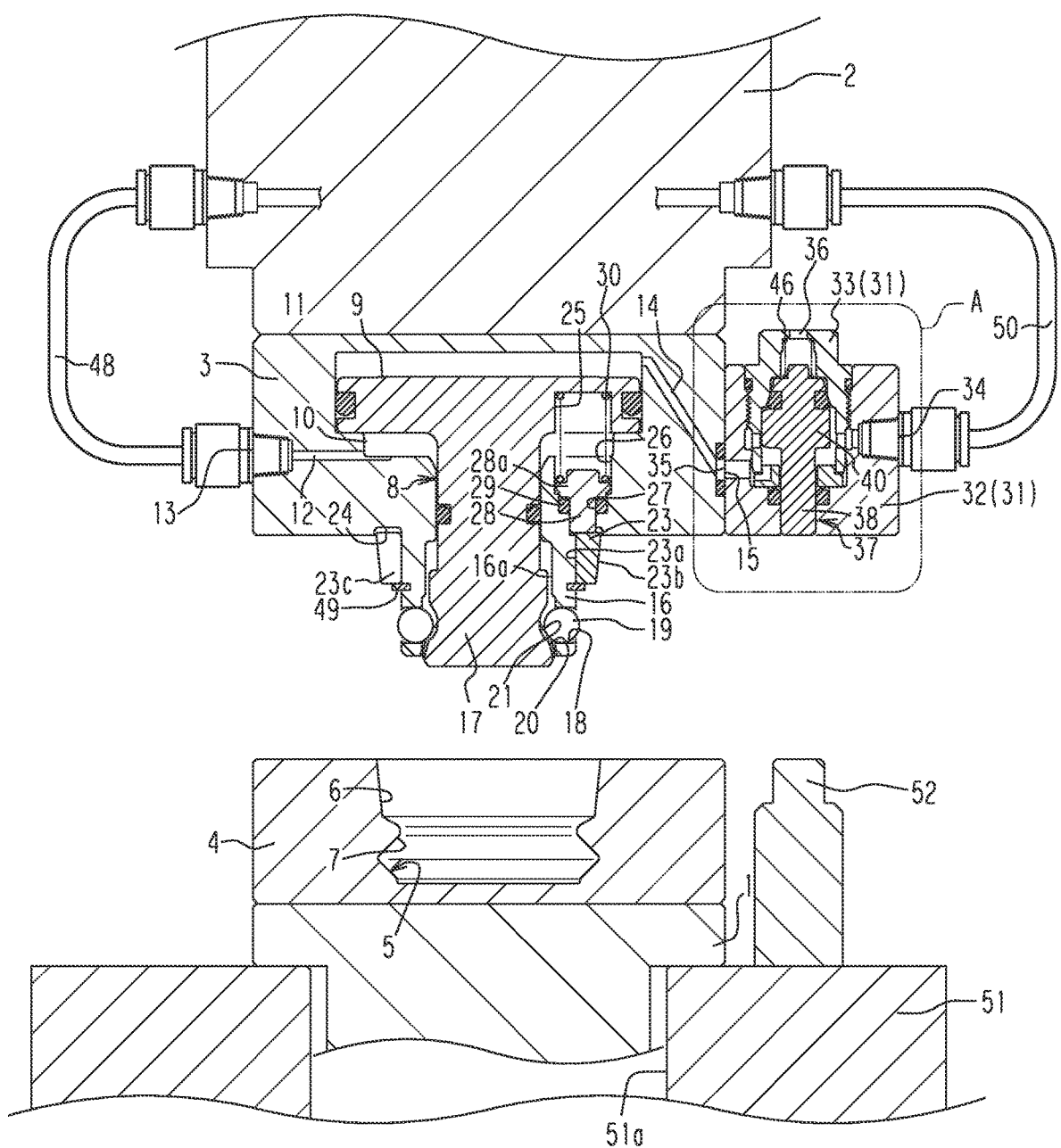
FIG. 3 is an elevational view in section of the clamping apparatus in the release state.
Figure 4:
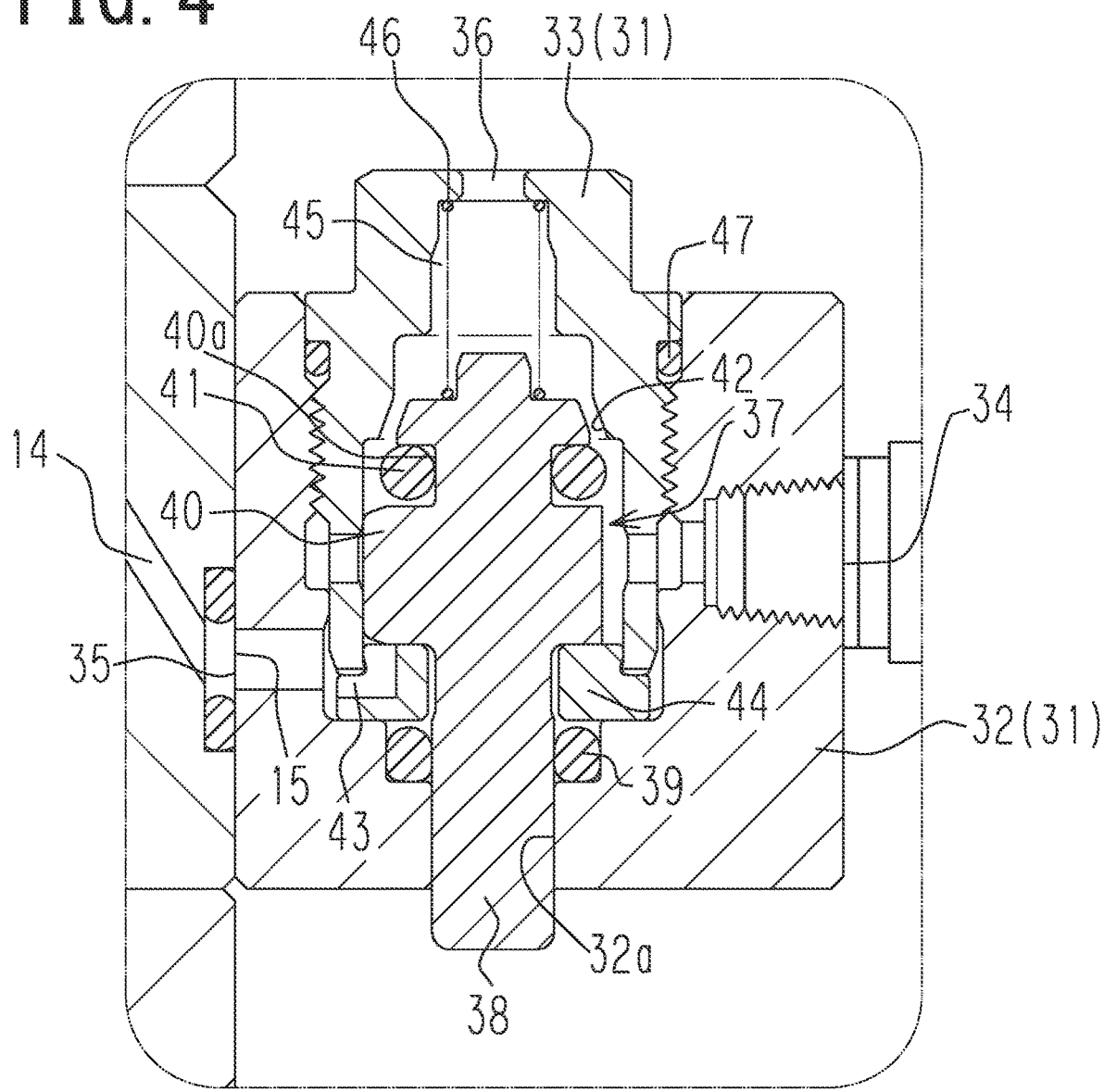
FIG. 4 is an enlarged view of a part A in FIG. 1.
Figure 5:
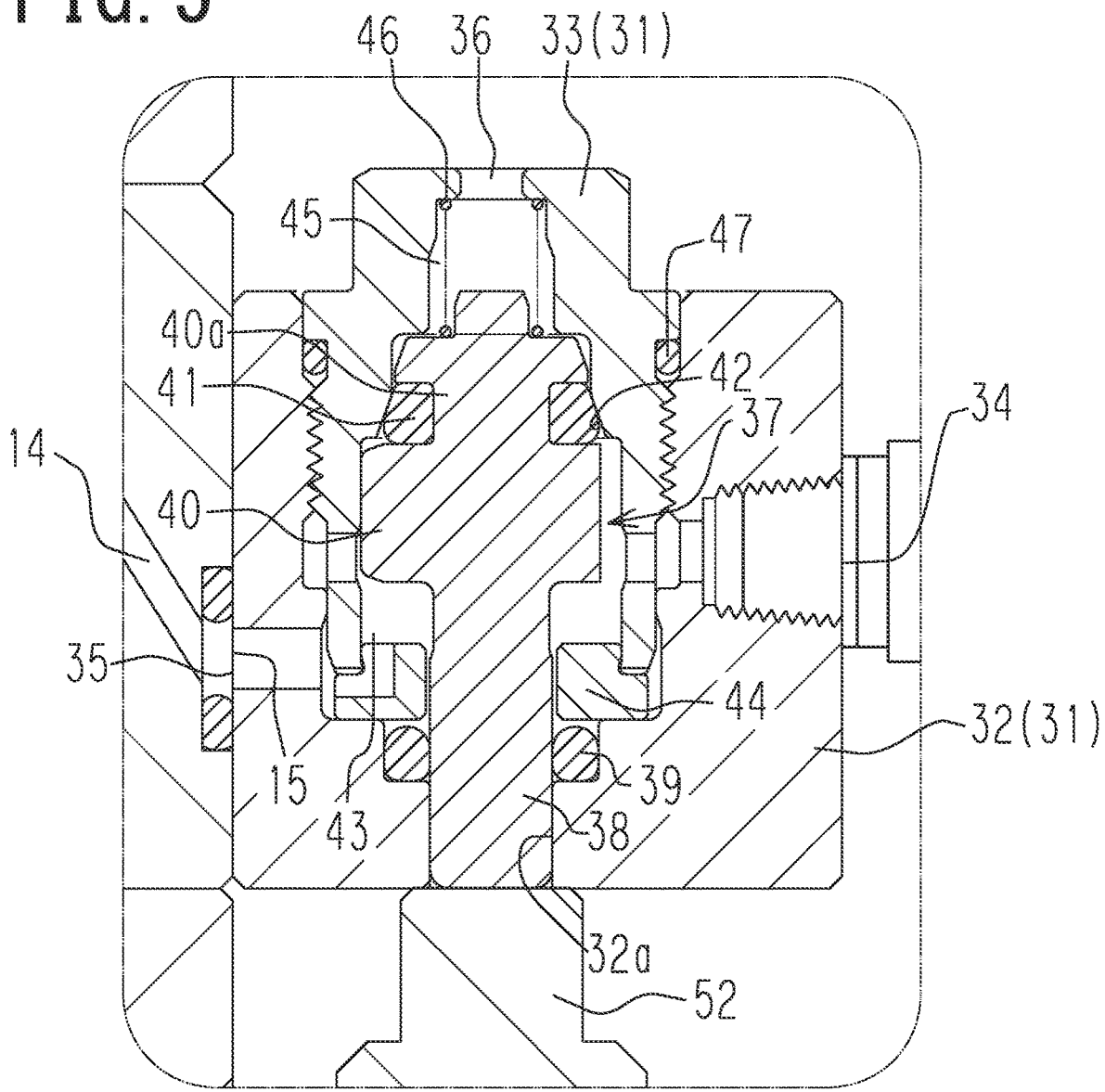
FIG. 5 is an enlarged view of a part A in FIG. 2.
Figure 6:
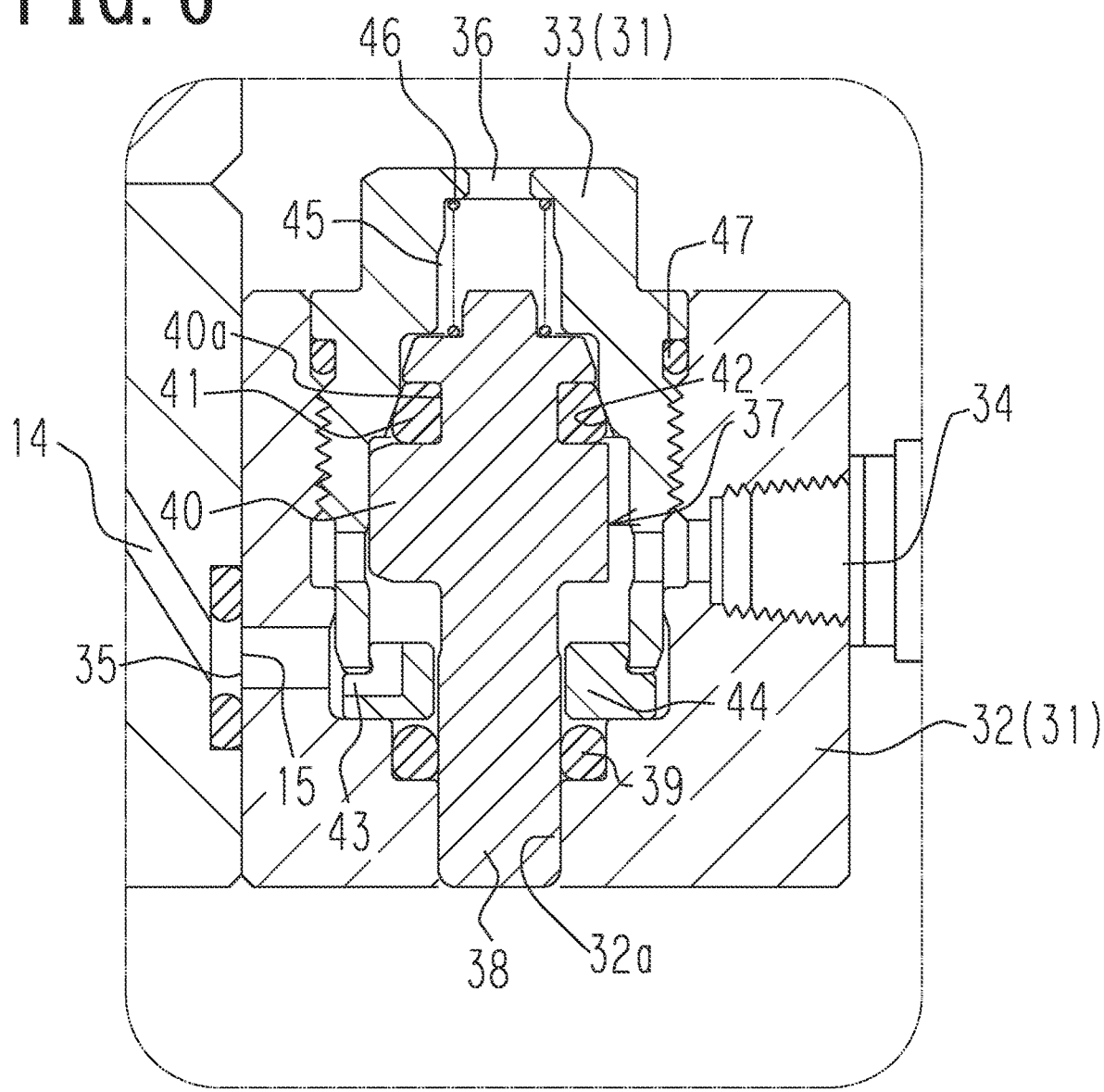
FIG. 6 is an enlarged view of a part A in FIG. 3.

Subsequently, compressed air is discharged from the lock chamber 10, and compressed air is supplied to the release chamber 11 via the primary-side pressure fluid supply/discharge port 34, the secondary-side pressure fluid supply/discharge port 35, and the like. As a result, due to the pressure in the release chamber 11, the piston main body 9 lowers the output rod portion 17, and a leading end of the output rod portion 17 is brought into contact with a bottom surface of the recess 5 of the tool adapter 4 (FIG. 2). When the output rod portion 17 tries to further descend due to the pressure in the release chamber 11, a reaction force thereto is applied to the master cylinder 3, and this slightly raises the master cylinder 3, as well as the robot arm 2. Due to this, the leading end of the output rod portion 17 somewhat protrudes relative to the plug portion 16, and this allows the engagement balls 19 to face their respective retraction grooves 21 on the output rod portion 17 and to move their respective radially inward disengaged positions. As the robot arm 2 is raised as shown in FIG. 3, the tool 1 is completely detached from the robot arm 2.

At this moment, compressed air is still kept supplied to the communication passage 43, which communicatively connects the primary-side pressure fluid supply/discharge port 34 to the secondary-side pressure fluid supply/discharge port 35 in the direction from the port 34 to the port 35. The pressure of the compressed air in the communication passage 43 biases the valve element body 40, with the result that the elastic member 41 is kept pressed onto the valve seat 42, that is, the second state, in which the communication between: each of the primary-side pressure fluid supply/discharge port 34 and the secondary-side pressure fluid supply/discharge port 35; and the pressure fluid discharge port 36 is closed, is still maintained. As a result, compressed air does not come out from the release chamber 11, and this maintains the pressure level of the compressed air in the release chamber 11. The pusher 38 is kept within the valve case 31.

The following describes operations of the tool changer at the time of attaching the tool 1 to the robot arm 2. The leading end portion of the robot arm 2 is lowered, and the plug portion 16 protruding from the master cylinder 3 is inserted into the recess 5 of the tool adapter 4. As the plug portion 16 is inserted, the leading end of the output rod portion 17 is brought into contact with the bottom surface of the recess 5 of the tool adapter 4. Subsequently, compressed air is discharged from the release chamber 11, while compressed air is supplied to the lock chamber 10. As compressed air is supplied to the lock chamber 10, the piston main body 9 raises the output rod portion 17 due to the increased pressure in the lock chamber 10. As a result, the pushing surface 20 provided on the outer peripheral surface of the output rod portion 17 pushes the engagement balls 19 outward in the radial direction, and the radial pushing force is converted to an upward force via the engaged portion 7. Due to the upward force, the tool adapter 4 is pulled upward. Then, the tapered hole 6 of the tool adapter 4 makes a tapering engagement with the tapered outer peripheral surface 23b of the sleeve 23, to cause the sleeve 23 to contract. The axis of the tapered hole 6 is aligned with the axis of the plug portion 16, and a top surface of the tool adapter 4 is received by an under surface of the master cylinder 3. The tool 1 is thus aligned with and attached to the robot arm 2.

Figure 7:
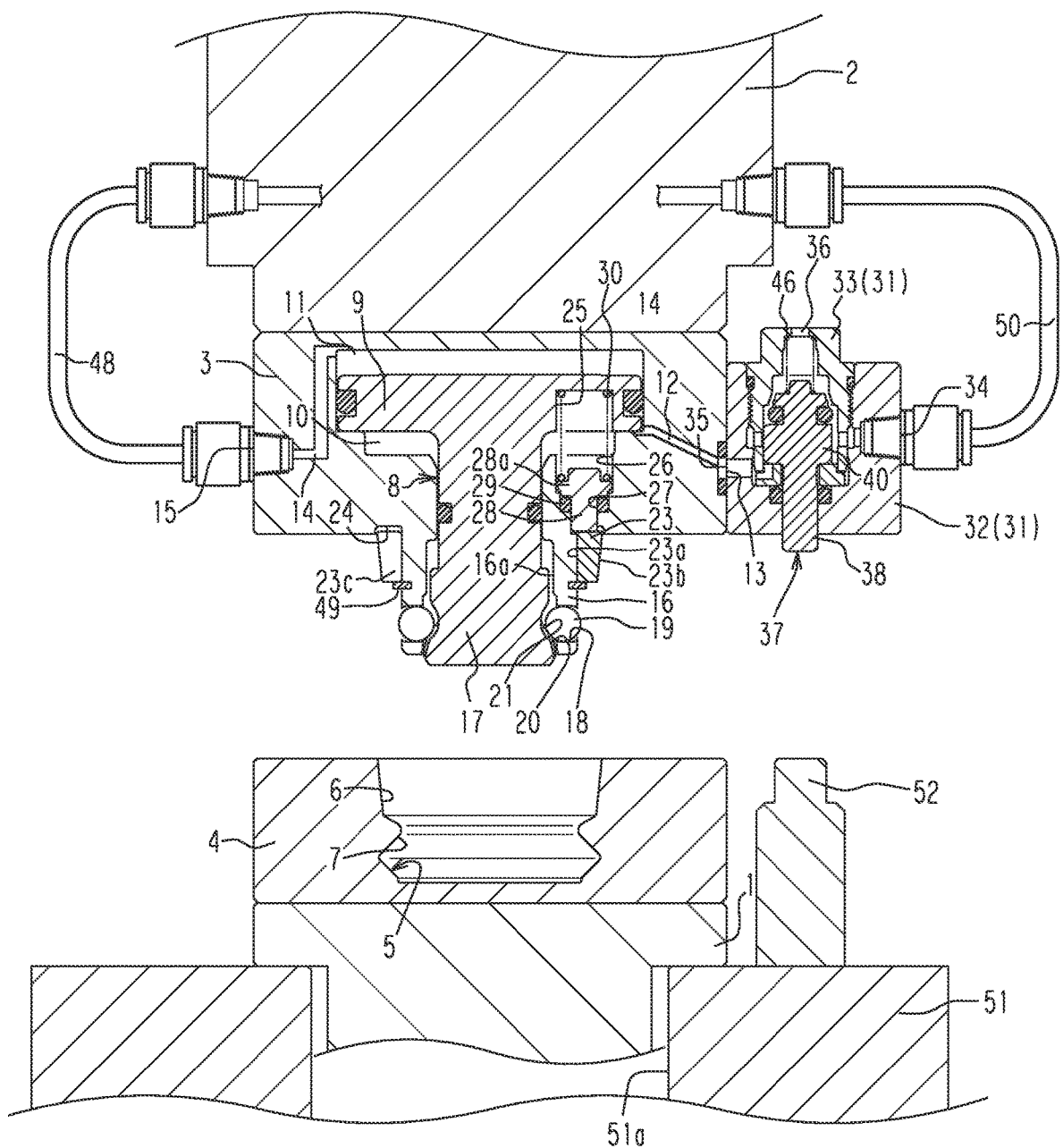
FIG. 7 shows a second embodiment of the present invention, and is an elevational view in section of a clamping apparatus (tool changer) in the release state.

FIG. 7 shows a second embodiment of the present invention. The second embodiment is different from the first embodiment in that the secondary-side pressure fluid supply/discharge port 35 provided on the surface of the valve case main body 32 is connected to the lock port 13, not to the release port 15, in the second embodiment. In the second embodiment, compressed air for releasing is supplied to and discharged from the pipe 48 connected to the release port 15, while compressed air for locking is supplied to and discharged from the pipe 50 connected to the primary-side pressure fluid supply/discharge port 34.

In the second embodiment, even if compressed air is supplied to the primary-side pressure fluid supply/discharge port 34 due to an operating error in the release state (in a state in which the tool adapter 4 (tool 1) is not attached), the piston 8 (the piston main body 9, the output rod portion 17) does not ascend, because compressed air is discharged from the pressure fluid discharge port 36 and therefore the pressure does not increase in the lock chamber 10. Because the output rod portion 17 does not ascend, the engagement balls 19 are not pushed outward by the pushing surface 20 of the output rod portion 17 and do not protrude outward in the radial direction relative to the plug portion 16. Accordingly, even if the plug portion 16 protruding from the master cylinder 3 is inserted in the recess 5 of the tool adapter 4 due to an operating error in the situation in which compressed air is supplied to the primary-side pressure fluid supply/discharge port 34, the engagement balls 19 do not collide with the engaged portion 7 provided on the tool adapter 4, to prevent damage to these elements.

The above-described embodiments are changeable as follows.

In each of the above embodiments, the valve member 37 is actuated by pressing an operation portion (the pusher 38) of the valve member 37 onto a fixed object (the pusher pressing member 52). Instead of this, the valve member 37 may be actuated by pushing the pusher 38 with a human finger or with a peripheral device, into the valve case 31.

The pusher 38 may protrude from a side or top surface of the valve case 31, instead of the under surface of the valve case 31.

Instead of the above-described sleeve 23, annually arranged components each having an arc-shaped cross section may be used. Furthermore, in each of the embodiments, any of the sleeve 23 and the sleeve advancing means (the pushing member 28, the advance spring 30, and the like) does not have to be provided.

As the engaging means configured to pull the tool adapter 4 (second block) toward the master cylinder 3 (first block) and to fix the tool adapter 4, a collet configured to be engaged with a straight engaged hole by virtue of friction, plastic deformation, or the like may be used instead of the engagement balls 19 configured to be engaged with the tapered hole like engaged portion 7.

The positions of the lock chamber 10 and the release chamber 11 may be replaced with each other. That is, the following arrangement is possible: the lock chamber 10 is provided on the backward side relative to the piston main body 9, while the release chamber 11 is provided on the forward side relative to the piston main body 9. In this arrangement, the pushing surface 20 on the leading end portion of the outer peripheral surface of the output rod portion 17 is designed so as to taper down toward the leading end side (so that its diameter decreases toward the leading end side). As compressed air is supplied to the lock chamber 10, the output rod portion 17 moves forward (descends), to fix the tool 1 to the robot arm 2.

Instead of compressed air, gas such as nitrogen gas or liquid such as pressurized oil may be used as pressure fluid.

The tool changer of the each of the above embodiments is a clamping apparatus, through which the tool 1 such as a machine tool and a jig is attached to/detached from the robot arm 2. The clamping apparatus of the present invention can be used also as a clamping apparatus configured to detachably fix a pallet or the like to a table or the like.

Embodiments of the present invention have been hereinabove described. It is a matter of course that other changes or alterations can be made on the present invention within the scope of envisagement of one skilled in the art.

REFERENCE SIGNS LIST

3: master cylinder (first block); 4: tool adapter (second block); 8: piston; 9: piston main body; 10: lock chamber; 11: release chamber; 13: lock port; 15: release port; 16: plug portion; 17: output rod portion; 19: engagement ball (engaging means); 31: valve case; 34: primary-side pressure fluid supply/discharge port; 35: secondary-side pressure fluid supply/discharge port; 36: pressure fluid discharge port; 37: valve member; 38: pusher (operation portion); 40: valve element body; 40*a*: groove; 41: elastic member; 42: valve seat; 43: communication passage; 45: pressure fluid discharge chamber; 46: spring (biasing means).

The invention claimed is:

1. A clamping apparatus comprising:
   a piston (8) including a piston main body (9) hermetically inserted in a first block (3) so as to be movable in an axial direction of the piston (8);
   a lock chamber (10), to and from which pressure fluid is supplied and discharged, the lock chamber (10) being provided on a forward or backward side relative to the piston main body (9);
   a lock port (13), which is provided to the first block (3) and through which the pressure fluid is supplied to/discharged from the lock chamber (10);
   a release chamber (11), to and from which the pressure fluid is supplied and discharged, the release chamber (11) being provided on a side opposite from the lock chamber (10) relative to the piston main body (9) interposed between the lock chamber (10) and the release chamber (11);
   a release port (15), which is provided to the first block (3) and through which the pressure fluid is supplied to/discharged from the release chamber (11);
   a plug portion (16) protruding from the first block (3) and configured to be inserted in a second block (4), the plug portion (16) having a tubular shape in which an output rod portion (17) of the piston (8) is inserted so as to be movable in the axial direction;
   an engaging means (19) configured to pull the second block (4) toward the first block (3) and fix the second block (4) as the output rod portion (17) moves in the axial direction;
   a valve case (31), which is provided to the first block (3) and to which there are provided a primary-side pressure fluid supply/discharge port (34) connected to a pressure fluid supply source, a pressure fluid discharge port (36) through which the pressure fluid is discharged, and a secondary-side pressure fluid supply/discharge port (35) connected to the lock port (13) or to the release port (15); and
   a valve member (37) disposed in the valve case (31), the valve member (37) having, at its end portion in the axial direction, an operation portion (38) protruding from the valve case (31), wherein
   when the operation portion (38) is pushed into the valve case (31), the apparatus transitions from a first state, in which communication between: each of the primary-side pressure fluid supply/discharge port (34) and the secondary-side pressure fluid supply/discharge port (35); and the pressure fluid discharge port (36) is open, to a second state, in which communication between: each of the primary-side pressure fluid supply/discharge port (34) and the secondary-side pressure fluid supply/discharge port (35); and the pressure fluid discharge port (36) is closed.

2. The clamping apparatus according to claim 1, wherein:
   a communication passage (43), which communicatively connects the primary-side pressure fluid supply/discharge port (34) to the secondary-side pressure fluid supply/discharge port (35), is provided in the valve case (31) on a first side close to the operation portion (38) relative to a valve element body (40) of the valve member (37); and
   while the pressure fluid is supplied to the communication passage (43) from the primary-side pressure fluid supply/discharge port (34) to the secondary-side pressure fluid supply/discharge port (35), pressure of the pressure fluid keeps the pushed operation portion (38) pushed within the valve case (31).

3. The clamping apparatus according to claim 2, wherein:
   a biasing means (46) configured to bias the valve element body (40) in a direction in which the operation portion (38) protrudes from the valve case (31) is disposed in a pressure fluid discharge chamber (45) in the valve case (31), the pressure fluid discharge chamber (45) being provided on a second side opposite from the operation portion (38) relative to the valve element body (40); and
   the operation portion (38) is configured to be pushed in the valve case (31) against a biasing force of the biasing means (46).

4. The clamping apparatus according to claim 2, wherein an annular elastic member (41), configured to be pressed onto a valve seat (42) provided on an inner peripheral surface of the valve case (31), is attached in an annular groove (40*a*) provided on an outer peripheral surface of the valve element body (40).

5. The clamping apparatus according to claim 3, wherein an annular elastic member (41), configured to be pressed onto a valve seat (42) provided on an inner peripheral surface of the valve case (31), is attached in an annular groove (40*a*) provided on an outer peripheral surface of the valve element body (40).

* * * * *